United States Patent [19]

Taylor et al.

[11] Patent Number: 4,914,384
[45] Date of Patent: Apr. 3, 1990

[54] MAGNETIC GAGE DRIVER CIRCUIT

[75] Inventors: David W. Taylor; Philip R. Peterson, both of Grand Blanc; Arthur C. Kovacic, Flint, all of Mich.

[73] Assignee: Lucas Cirtek Corporation, Flint, Mich.

[21] Appl. No.: 364,096

[22] Filed: Jun. 12, 1989

[51] Int. Cl.$^4$ .................. G01F 23/36; G08B 21/00
[52] U.S. Cl. .................. 324/125; 324/123 R; 73/304 R; 73/313; 340/618
[58] Field of Search .................. 324/125, 61 R, 99 D; 73/313, 306–308, 304 R, 304 C, 1 H; 307/490, 491; 340/618, 620

[56] References Cited

U.S. PATENT DOCUMENTS

| 3,566,266 | 2/1971 | Bloom | 324/123 R |
| 4,627,280 | 12/1986 | Hayashi et al. | 73/290 R |
| 4,635,043 | 1/1987 | Kronenberg et al. | 73/313 |
| 4,782,699 | 11/1988 | Gonze | 73/308 |
| 4,799,047 | 1/1989 | Saitoh | 340/618 |

FOREIGN PATENT DOCUMENTS 0048017 3/1982 European Pat. Off. .............. 73/306

Primary Examiner—Reinhard J. Eisenzopf
Assistant Examiner—Vinh P. Nguyen
Attorney, Agent, or Firm—Learman & McCulloch

[57] ABSTRACT

A driver circuit for magnetic gages that electrically simulates the gage, both with and without a parallel resistor joined in conjunction therewith. An averaging circuit assists in preventing the circuit from responding to transient variations in the monitored parameter.

10 Claims, 1 Drawing Sheet

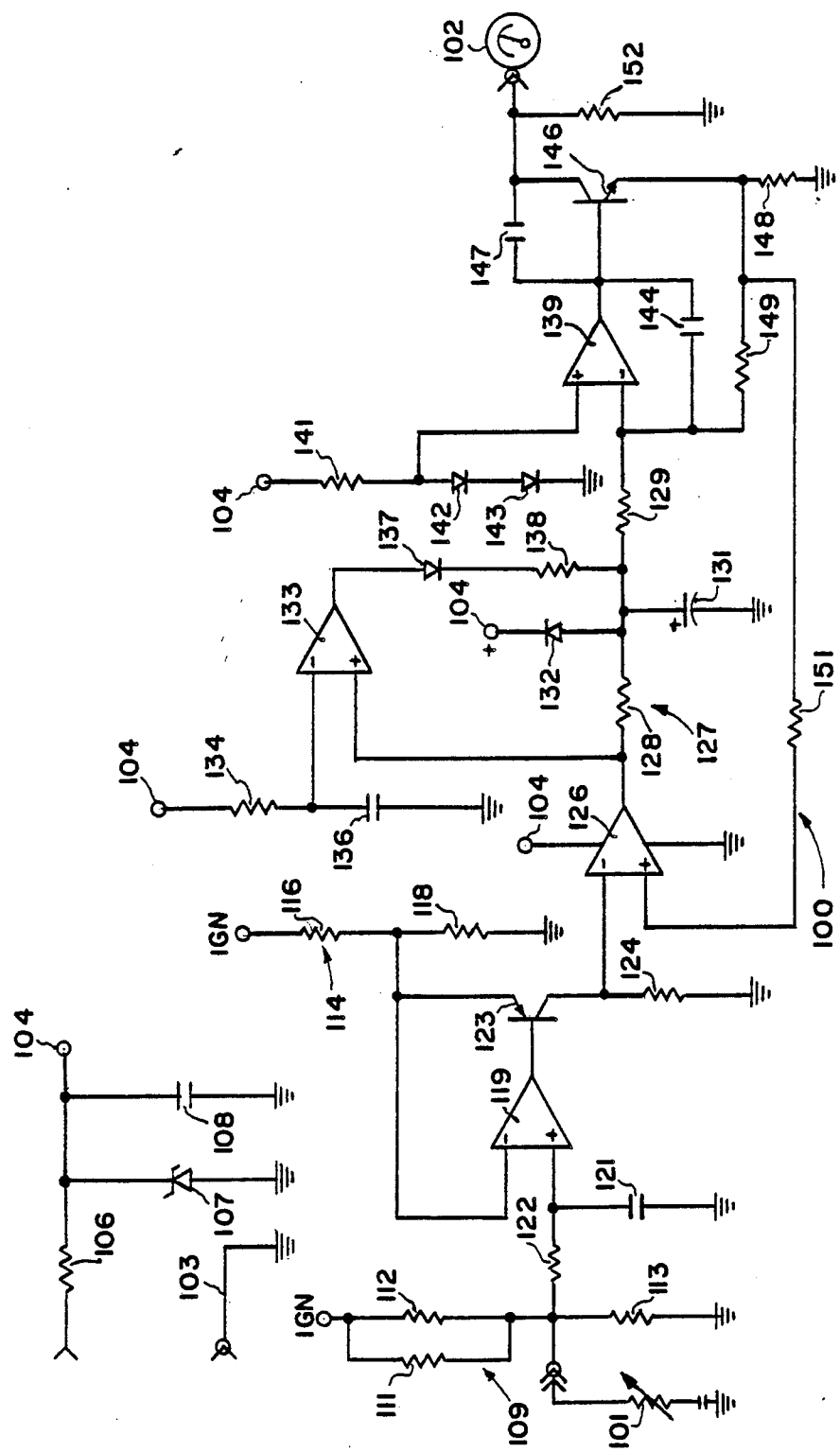

MAGNETIC GAGE DRIVER CIRCUIT

This invention relates generally to gage driver circuits, and more particularly to driver circuits especially useful with magnetic gages.

BACKGROUND OF THE INVENTION

Magnetic gages are well known in the art and usually include a meter face having an appropriately calibrated scale thereon and a needle that oscillates in response to an electric signal that is to be measured. The position of the needle with respect to the calibrated scale allows the electric signal value to be ascertained. Such meters are used, for example, when measuring a volume of fuel that remains in a fuel tank of a vehicle.

Generally, the electric signal applied to the gage is developed by an appropriate sensor, such as a fluid level sensor. Such sensors provide an electric signal that constitutes an instantaneous representation of the monitored parameter, such as the level of fuel in a fuel tank. Therefore, the electric signal can be expected to vary (sometimes significantly) from moment to moment, as the parameter being monitored experiences transient events. For example, fuel in a fuel tank will tend to vary its surface not only as a function of volume, but also as a function of the inclination and orientation of the fuel tank itself at any given moment.

It is undesirable for the needle of an associated gage to fluctuate in a direct correspondence with such transient changes, since such changes do not represent valid changes of the measured parameter and further because such changes make use of the gage more difficult.

A need therefore exists for a magnetic gage driver circuit that will enable the gage needle reliably to represent the monitored parameter, while simultaneously preventing the needle from fluctuating rapidly due to transient disturbances of the monitored parameter. Such a driver circuit preferably should not degrade the accuracy of the gage reading.

SUMMARY OF THE INVENTION

The needs referred to above are substantially met by the magnetic gage driver circuit disclosed herein. This circuit operates in conjunction with a magnetic gage and a gage signal source. The circuit includes generally a resistor that is coupled to the magnetic gage, a first simulation unit coupled to the gage signal source for simulating the magnetic gage, and a second simulation unit that simulates the magnetic gage as coupled to the resistor. A signal processing unit produces a drive signal in response to these two simulation units, and such drive signal is used to drive the magnetic gage.

In one embodiment the signal processing unit includes a first comparator that effectively compares the signals produced by the first and second simulation units. This comparison signal is then used to drive a current sink. The current sink forces a flow of current that is a scaled equal of the current in the gage signal source, and the signal processing unit uses this scaled equal to develop the drive signal.

In one embodiment the signal processing unit also includes a second comparator unit that compares a signal related to the above noted forced current flow with a feedback signal that is related to the drive signal provided to the gage. An averaging circuit, which includes an RC network having a relatively long time constant, is used to average the output signal of the second comparator unit over time. This averaged signal is provided to an output current sink that forces the drive signal for use by the gage.

The gage accurately will reflect the monitored parameter, but transient responses will generally not be reflected by the gage, since such responses are effectively averaged out by the averaging circuit. At the same time, this circuit generally assures that the gage accurately will reflect the monitored parameter.

THE DRAWING

The preferred embodiment of the invention is disclosed in the drawing which comprises a schematic diagram of the magnetic gage driving circuit.

DETAILED DESCRIPTION

The circuit of the invention is designated generally by the reference character 100 and operates in conjunction with a gage signal source 101 and a gage 102. The gage signal source 101 functions to develop an electric signal that corresponds in value to a parameter that is monitored by the device. For example, the device might include a liquid level sensor mounted in a fuel tank of a vehicle so as to produce in known manner a source signal that is related to the level of fuel in the monitored tank.

Assuming this particular operating environment for purposes of description, the circuit 100 includes an appropriate ground connection 103 for use by the remainder of the circuit, and a transient protected power supply 104 developed from the ignition system of the vehicle. The power supply includes a 120 ohm (2 watt) resistor 106 that is coupled to a parallel configured and grounded 30 volt Zener diode 107 and a 0.01 microfarad capacitor 108.

The gage signal source 101 is coupled to a first simulated gage unit 109 that includes generally three precision resistors 111, 112, and 113. The resistors 111 and 112 are coupled in parallel with one another and in series with the third resistor 113. The resistor 111 has a value of 604 ohms, the second resistor 112 has a value of 100 ohms and the third resistor 113 has a value of 200 ohms.

So configured, the three resistors 111, 112, and 113 electronically simulate the resistive nature of the magnetic gage 102. The voltage across the third resistor 113 is proportional to the parameter that is monitored by the gage signal source 101.

A second set of resistors 116 and 118, biased in series between the ignition and ground, comprise a second simulation unit 114. The first resistor 116 has a value of 8.66K ohms, and the second resistor 118 has a value of 8.87K ohms. So configured, the second simulation unit 114 electrically simulates the gage 102 in combination with a parallel resistor (described below in more detail).

A first comparator 119 is coupled to both of the simulation units 109 and 114. In particular, the noninverting input of the comparator 119 is coupled to the first simulation unit via an RC network comprised of a 10Kohm resistor 122 and a grounded 0.01 microfarad capacitor 121. The inverting input of the comparator 119 is coupled to the second simulation unit 114 and to the emitter of a PNP transistor 123. The base of the transistor 123 is connected to the output of the comparator 119 and the collector is coupled to a current sense resistor 124 having a value of 1.5K ohms. So configured, the transistor 123 acts as a current sink for the second simulation unit 114.

The first comparator 119 compares the output signal from the first simulation unit 109 with the output from the second simulation unit 114 due to the action of the current sink transistor 123. The comparator 119 functions to drive the current sink to cause it to make the voltage of the second simulation unit 114 equal to the voltage of the first simulation unit 109. As a result, the emitter current for the transistor 123 constitutes a scaled equal of the current then flowing through the gage signal source 101 as adjusted for the parallel resistor included in the electrical simulation provided by the second simulation unit 114.

The scaled equal current flows through the current sense resistor 124 and develops a voltage thereacross that is proportional to the current that would flow through the gage signal source 101 if a parallel resistor of the proper scale were connected to the gage. This representational voltage is presented to the inverting input of a second comparator 126. The noninverting input for the second comparator 126 receives a feedback signal that relates to the drivecurrent actually provided to the gage, as described in more detail below.

The output of the second comparator 126 is coupled to an averaging circuit 127. The averaging circuit includes generally two resistors 128 and 129 having values of 3M ohms and 1.5M ohms, respectively, and a 100 microfarad capacitor 131. The capacitor 131 also is coupled to the system bias source 104 through a diode 132. The operation of this averaging circuit will be explained below.

The output of the second comparator 126 also is connected to the noninverting input of a third comparator 133, the inverting input of which is coupled between a system biased 1M ohm resistor 134 and a grounded 0.33 microfarad capacitor 136. The output of the third comparator 133 is coupled through a series connected diode 137 and a 10K ohm resistor 138 to the averaging circuit capacitor 131. So configured, the averaging circuit capacitor 131 will charge relatively quickly, and discharge relatively slowly. As a result the output signal from the second comparator 126, which represents the gage signal source, quickly and effectively rise to the input fuel level reading. Thereafter this circuit will time out and have no further function.

The output of the averaging circuit 127 is coupled to the inverting input of a fourth comparator 139, the noninverting input of which is connected between a system biased 1K ohm resistor 141 and a series connected pair of grounded diodes 142 and 143. A 0.01 microfarad capacitor 144 is connected between the output of the fourth comparator 139 and the inverting input thereof.

The output of the fourth comparator 139 drives a second transistor 146 that also serves as a current sink. The collector of the transistor 146 is coupled back to its base via a 0.01 microfarad capacitor 147, and the emitter is coupled, first, to ground via a 15 ohm current sense resistor 148; second, to the inverting input of the fourth comparator 139 via a 1M ohm feedback resistor 149; and third to the noninverting input of the second comparator via a 1.5K ohm feedback resistor 151.

So configured, the current sense resistor 148 which is coupled to the second transistor 146 will develop a voltage that is proportional to the current being drawn by the second transistor 146. The fourth comparator 139 in turn functions to maintain the average current through the second transistor 146 substantially proportional to the current being drawn by the first transistor 123. As a result, the circuit operates to maintain the average current through the output transistor 146 substantially equal to the current flow through the second simulation unit 114.

A precision 158 ohm resistor 152 is coupled in parallel with the gage 102. It is this resistor 152 that is electrically modeled by the second simulation unit 114.

The circuitry according to the invention effectively drives the gage by effectively simulating a resistance, versus forcing a voltage per se, particularly under operating conditions that encourage the presence of higher resistance regions. By driving the gage in this manner, the gage will display an accurate representation of the gage signal source signal, while substantially avoiding needle fluctuations that would otherwise result due to monitored parameter transient variations.

We claim:

1. A gage driver circuit for use with a magnetic gage and a gage signal source for providing a source signal to be displayed by said magnetic gage, comprising:
   (a) a resistor coupled to said magnetic gage;
   (b) first simulation means coupled to said gage signal source for simulating said magnetic gage;
   (c) second simulation means for simulating said magnetic gage coupled to said resistor; and
   (d) signal processing means coupled to said first simulation means and to said second simulation means for providing a drive signal to said magnetic gage.

2. The gage driver circuit according to claim 1 wherein said drive signal comprises substantially an average of said source signal.

3. The gage driver circuit according to claim 1 wherein said signal processing means includes:
   (e) first comparator means for comparing a first signal from said first simulation means with a second signal from said second simulation means, and for providing a first comparison signal in response thereto; and
   (f) current sink means responsive to said first comparison signal for forcing a flow of current that is substantially a scaled equal of current flowing through said gage signal source.

4. The gage driver circuit according to claim 3 wherein said signal processing means includes:
   (g) second comparator means for comparing a signal related to said scaled equal of current flowing through said gage signal source with a feedback signal related to current flow for a drive signal as provided to said magnetic gage, and for providing a second comparison signal in response thereto; and
   (h) output current sink means responsive to said second comparison signal for providing said drive signal to said magnetic gage.

5. The gage driver circuit according to claim 4 wherein said signal processing means includes averaging means operatively coupled to said second comparator means for averaging said second comparison signal as applied to said output current sink means.

6. The gage driver circuit according to claim 5 wherein said averaging means responds at a first rate when said second comparison signal is increasing in value, and at a second rate when said second comparison signal is decreasing in value.

7. The gage driver circuit according to claim 6 wherein said first rate is faster than said second rate.

8. The gage driver circuit according to claim 5 wherein said averaging means further functions upon initial operation of the gage driver circuit to cause said second comparator means to respond rapidly to the signal that is related to said scaled equal of the current through said gage signal source.

9. The gage driver circuit according to claim 8 wherein said averaging means further functions subsequent to initial operation of the gage driver circuit to respond more slowly to the signal that is related to said scaled equal of current through said gage signal source.

10. A gage driver circuit for use with a magnetic gage and a gage signal source for providing a source signal to be displayed by said magnetic gage, comprising:

(a) a resistor coupled to said magnetic gage;
(b) first simulation means coupled to said gage signal source for simulating said magnetic gage;
(c) second simulation means for simulating, said magnetic gage coupled to said resistor; and
(d) signal processing means coupled to said first simulation means and to said second simulation means for providing a drive signal to said magnetic gage, said second simulation means compensating for the presence of said resistor and enhancing accuracy of said gage driver circuit.

* * * * *